United States Patent [19]

Nagata

[11] Patent Number: 6,009,396
[45] Date of Patent: Dec. 28, 1999

[54] METHOD AND SYSTEM FOR MICROPHONE ARRAY INPUT TYPE SPEECH RECOGNITION USING BAND-PASS POWER DISTRIBUTION FOR SOUND SOURCE POSITION/DIRECTION ESTIMATION

[75] Inventor: Yoshifumi Nagata, Hyogo, Japan

[73] Assignee: Kabushiki Kaisha Toshiba, Kanagawa, Japan

[21] Appl. No.: 08/818,672

[22] Filed: Mar. 14, 1997

[30] Foreign Application Priority Data

Mar. 15, 1996 [JP] Japan .................................. P08-05821

[51] Int. Cl.$^6$ ....................................................... G10L 3/00
[52] U.S. Cl. .............................. 704/270; 704/233; 381/92
[58] Field of Search .............................. 381/92; 704/233, 704/275; 367/119, 120–127

[56] References Cited

U.S. PATENT DOCUMENTS

| | | | |
|---|---|---|---|
| 4,741,038 | 4/1988 | Elko et al. .................................. | 381/92 |
| 4,955,003 | 9/1990 | Goldman .................................. | 367/125 |
| 5,008,630 | 4/1991 | Reimel ..................................... | 367/125 |
| 5,581,620 | 12/1996 | Brandstein et al. ..................... | 367/126 |

OTHER PUBLICATIONS

Sullivan et al. multimicrophone correlation based processing for robust speech recognition, Apr. 1993.

Zhang et al. a new method of tracking talker location for microphone arrays. applications of signal processing to audio and acoustics, 1995.

Giuliani et al. hands free continuous speech recognition in noisy environment using a four microphone array. ICASSP '95: Acoustics, Speech and Signal Processing Conference, 1995.

Flanagan et al. a ditital teleconferencing system with integrated modalities for human/machine communications: humannet. ICASSP '91, 1991.

Lin et al. Microphone arrays and spkeaer identifications. IEEE tyransaction on Speech and Audio Processing, 1994.

Bub et al., "Knowing who to listen to in Speech Recognition: Visually Guided Beamforming",ICASSP '95, 848–851 (1995).

Sullivan et al.; "Multi–Microphone correlation–Based Processing For Robust Speech Recognition"; Institute of Electrical and Electronics Engineers; vol. 2; Apr. 27, 1993.

Huang et al., "A Biomimetic System For Localization And Separation of Multiple Sound Sources"; IEEE Transactions on Instrumentation and Measurement; vol. 44, No. 3; Jun. 1, 1995; pp. 733–738.

Bub et al.; "Knowing Who To Listen To In Speech Recognition: Visually Guided Beamforming"; Institute of Electrical and Electronics Engineer; vol. 1; May 9, 1995; pp. 848–851.

*Primary Examiner*—Emanuel Todd Voeltz
*Assistant Examiner*—M. David Sofocleous
*Attorney, Agent, or Firm*—Foley & Lardner

[57] ABSTRACT

A microphone array input type speech recognition scheme capable of realizing a high precision sound source position or direction estimation by a small amount of calculations, and thereby realizing a high precision speech recognition. A band-pass waveform, which is a waveform for each frequency bandwidth, is obtained from input signals of the microphone array, and a band-pass power of the sound source is directly obtained from the band-pass waveform. Then, the obtained band-pass power is used as the speech parameter. It is also possible to realize the sound source estimation and the band-pass power estimation at high precision while further reducing an amount of calculations, by utilizing a sound source position search processing in which a low resolution position estimation and a high resolution position estimation are combined.

26 Claims, 11 Drawing Sheets

DIRECTION ESTIMATION

POSITION ESTIMATION

HIGH RESOLUTION, COARSE SEARCH

LOW RESOLUTION, COARSE SEARCH

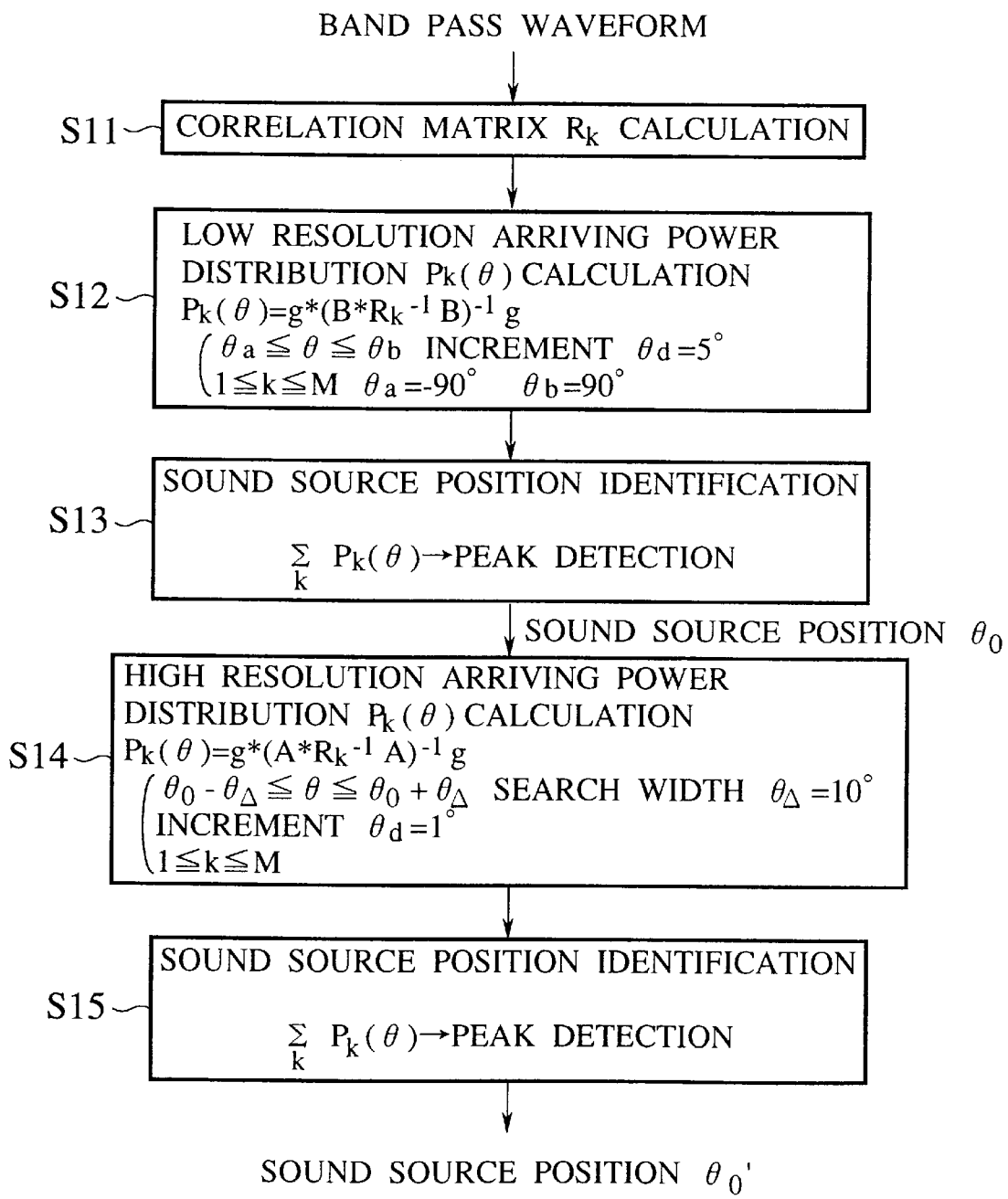

6,009,396

METHOD AND SYSTEM FOR MICROPHONE ARRAY INPUT TYPE SPEECH RECOGNITION USING BAND-PASS POWER DISTRIBUTION FOR SOUND SOURCE POSITION/DIRECTION ESTIMATION

BACKGROUND OF THE INVENTION

1. Field of the Invention

The present invention relates to a microphone array input type speech recognition scheme in which speeches uttered by a user are inputted through microphone array and recognized.

2. Description of the Background Art

In the speech recognition, a surrounding environment under which the speech input is made can largely affect the recognition performance. In particular, background noises and reflected sounds of the user's speeches can degrade the recognition performance so that they are sources of a serious problem encountered in a use of a speech recognition system. For this reason, in general, a short range microphone designed for use near the mouth of the user such as a headset microphone or a hand microphone has been employed, but it is uncomfortable to wear the headset microphone on a head for any extended period of time, while the hand microphone can limit a freedom of the user as it occupies the user's hands, and there has been a demand for a speech input scheme that can allow more freedom to the user.

A microphone array has been studied as a potential candidate for a speech input scheme that can resolve the conventionally encountered inconvenience described above, and there are some recent reports of its application to the speech recognition system. The microphone array is a set of a plurality of microphones which are arranged at spatially different positions, where noises can be reduced by the synthetic processing of outputs of these microphones.

FIG. 1 shows a configuration of a conventional speech recognition system using a microphone array. This speech recognition system of FIG. 1 comprises a speech input unit 11 having a microphone array formed by a plurality (N sets) of microphones, a sound source direction estimation unit 12, a sound source waveform estimation unit 13, a speech detection unit 14, a speech analysis unit 15, a pattern matching unit 16, and a recognition dictionary 17.

In this configuration of FIG. 1, the speech entered at the microphone array is converted into digital signals for respective microphones by the speech input unit 11, and the speech waveforms of all channels are entered into the sound source direction estimation unit 12.

At the sound source direction estimation unit 12, a sound source position or direction is estimated from time differences among signals from different microphones, using the known delay sum array method or a method based on the cross-correlation function as disclosed in U. Bub, et al.: "Knowing Who to Listen to in Speech Recognition: Visually Guided Beamforming", ICASSP '95, pp. 848–851, 1995.

A case of estimating a direction of the sound source and a case of estimating a position of the sound source respectively correspond to a case in which the sound source is far distanced from the microphone array so that the incident sound waves can be considered as plane waves and a case in which the sound source is relatively close to the microphone array so that the sound waves can be considered as propagating in forms of spherical waves.

Next, the sound source waveform estimation unit 13 focuses the microphone array to the sound source position or direction obtained by the sound source direction estimation unit 12 by using the delay sum array method, and estimates the speech waveform of the target sound source.

Thereafter, similarly as in the usual speech recognition system, the speech analysis is carried out for the obtained speech waveform by the speech analysis unit 15, and the pattern matching using the recognition dictionary 17 is carried out for the obtained analysis parameter, so as to obtain the recognition result. For a method of pattern matching, there are several known methods including the HMM (Hidden Markov Model), the multiple similarity method, and the DP matching, as detailed in Rabiner et al.: "Fundamentals of Speech Recognition", Prentice Hall, for example.

Now, in the speech recognition system, it is custom to input the speech waveform. For this reason, even in the conventional speech recognition system using the microphone array as described above, the sound source position (or the sound source direction) and the speech waveform are obtained by processing the microphone array outputs according to the delay sum array method, due to a need to estimate the speech waveform by a small amount of calculations. The delay sum array method is often utilized because the speech waveform can be obtained by a relatively small amount of calculations, but the delay sum array method is also associated with a problem that the separation power is lowered when a plurality of sound sources are located close to each other.

On the other hand, as a method for estimating the sound source position (or direction), there is a parametric method based on a model as disclosed in S. V. Pillai: "Array Signal Processing", Springer-Verlag, New York, 1989, for example, which is presumably capable of estimating the sound source position at higher precision than the delay sum array method, and which is also capable of obtaining the power spectrum necessary for the speech recognition from the sound source position estimation processing at the same time.

FIG. 2 shows a processing configuration for this conventionally proposed parametric method. In the configuration of FIG. 2, signals from a plurality of microphones are entered at a speech input unit 21, and the frequency analysis based on the FFT (Fast Fourier Transform) is carried out at a frequency analysis unit 22. Then, the sound source position estimation processing is carried out for each frequency component at a power estimation unit 23, and the final sound source position estimation result is obtained by synthesizing the estimation results for all the frequencies at a sound source direction judgement unit 24.

Here, the sound source position estimation processing is a processing for estimating a power at each direction or position while minutely changing a direction or position over a range in which the sound source can possibly be located, so that a very large amount of calculations are required. In particular, in a case of assuming the propagation of sound waves in forms of spherical waves, it is going to estimate a position of the sound source rather than an arriving direction of the sound waves, so that two- or three-dimensional scanning is necessary and consequently an enormous amount of calculations are required.

Moreover, in the conventionally proposed parametric method described above, it is necessary to carry out this scanning processing for each frequency component obtained by the fast Fourier transform of the speech, so that it is difficult to reduce a required amount of calculations.

SUMMARY OF THE INVENTION

It is therefore an object of the present invention to provide a method and a system for microphone array input type speech recognition capable of realizing a high precision sound source position or direction estimation by a small amount of calculations, and thereby realizing a high precision speech recognition. This object is achieved by obtaining a band-pass waveform, which is a waveform for each frequency bandwidth, from input signals of the microphone array, and directly obtaining a band-pass power of the sound source from the band-pass waveform. Then, the obtained band-pass power can be used as the speech parameter.

It is another object of the present invention to provide a method and a system for microphone array input type speech recognition capable of realizing the sound source estimation and the band-pass power estimation at high precision while further reducing an amount of calculations. This object is achieved by utilizing a sound source position search processing in which a low resolution position estimation and a high resolution position estimation are combined.

According to one aspect of the present invention there is provided a microphone array input type speech recognition system, comprising: a speech input unit for inputting speeches in a plurality of channels using a microphone array formed by a plurality of microphones; a frequency analysis unit for analyzing an input speech of each channel inputted by the speech input unit, and obtaining band-pass waveforms for each channel, each band-pass waveform being a waveform for each frequency bandwidth; a sound source position search unit for calculating a band-pass power distribution for each frequency bandwidth from the band-pass waveforms for each frequency bandwidth obtained by the frequency analysis unit, synthesizing calculated band-pass power distributions for a plurality of frequency bandwidths, and estimating a sound source position or direction from a synthesized band-pass power distribution; a speech parameter extraction unit for extracting a speech parameter for speech recognition, from the band-pass power distribution for each frequency bandwidth calculated by the sound source position search unit, according to the sound source position or direction estimated by the sound source position search unit; and a speech recognition unit for obtaining a speech recognition result by matching the speech parameter extracted by the speech parameter extraction unit with a recognition dictionary.

According to another aspect of the present invention there is provided a microphone array input type speech analysis system, comprising: a speech input unit for inputting speeches in a plurality of channels using a microphone array formed by a plurality of microphones; a frequency analysis unit for analyzing an input speech of each channel inputted by the speech input unit, and obtaining band-pass waveforms for each channel, each band-pass waveform being a waveform for each frequency bandwidth; a sound source position search unit for calculating a band-pass power distribution for each frequency bandwidth from the band-pass waveforms for each frequency bandwidth obtained by the frequency analysis unit, synthesizing calculated band-pass power distributions for a plurality of frequency bandwidths, and estimating a sound source position or direction from a synthesized band-pass power distribution; and a speech parameter extraction unit for extracting a speech parameter from the band-pass power distribution for each frequency bandwidth estimated by the sound source position search unit, according to the sound source position or direction estimated by the sound source position search unit.

According to another aspect of the present invention there is provided a microphone array input type speech analysis system, comprising: a speech input unit for inputting speeches in a plurality of channels using a microphone array formed by a plurality of microphones; a frequency analysis unit for analyzing an input speech of each channel inputted by the speech input unit, and obtaining band-pass waveforms for each channel, each band-pass waveform being a waveform for each frequency bandwidth; and a sound source position search unit for calculating a band-pass power distribution for each frequency bandwidth from the band-pass waveforms for each frequency bandwidth obtained by the frequency analysis unit, synthesizing calculated band-pass power distributions for a plurality of frequency bandwidths, and estimating a sound source position or direction from a synthesized band-pass power distribution.

According to another aspect of the present invention there is provided a microphone array input type speech recognition method, comprising the steps of: inputting speeches in a plurality of channels using a microphone array formed by a plurality of microphones; analyzing an input speech of each channel inputted by the inputting step, and obtaining band-pass waveforms for each channel, each band-pass waveform being a waveform for each frequency bandwidth; calculating a band-pass power distribution for each frequency bandwidth from the band-pass waveforms for each frequency bandwidth obtained by the analyzing step, synthesizing calculated band-pass power distributions for a plurality of frequency bandwidths, and estimating a sound source position or direction from a synthesized band-pass power distribution; extracting a speech parameter for speech recognition, from the band-pass power distribution for each frequency bandwidth calculated by the calculating step, according to the sound source position or direction estimated by the calculating step; and obtaining a speech recognition result by matching the speech parameter extracted by the extracting step with a recognition dictionary.

According to another aspect of the present invention there is provided a microphone array input type speech analysis method, comprising the steps of: inputting speeches in a plurality of channels using a microphone array formed by a plurality of microphones; analyzing an input speech of each channel inputted by the inputting step, and obtaining band-pass waveforms for each channel, each band-pass waveform being a waveform for each frequency bandwidth; calculating a band-pass power distribution for each frequency bandwidth from the band-pass waveforms for each frequency bandwidth obtained by the analyzing step, synthesizing calculated band-pass power distributions for a plurality of frequency bandwidths, and estimating a sound source position or direction from a synthesized band-pass power distribution; and extracting a speech parameter from the band-pass power distribution for each frequency bandwidth calculated by the calculating step, according to the sound source position or direction estimated by the calculating step.

According to another aspect of the present invention there is provided a microphone array input type speech analysis method, comprising the steps of: inputting speeches in a plurality of channels using a microphone array formed by a plurality of microphones; analyzing an input speech of each channel inputted by the inputting step, and obtaining band-pass waveforms for each channel, each band-pass waveform being a waveform for each frequency bandwidth; and calculating a band-pass power distribution for each frequency bandwidth from the band-pass waveforms for each frequency bandwidth obtained by the analyzing step, synthesizing calculated band-pass power distributions for a plurality of frequency bandwidths, and estimating a sound source position or direction from a synthesized band-pass power distribution.

Other features and advantages of the present invention will become apparent from the following description taken in conjunction with the accompanying drawings.

BRIEF DESCRIPTION OF THE DRAWINGS

FIG. 13 is a flow chart for the processing of the sound source position search unit of FIG. 12.

DETAILED DESCRIPTION OF THE PREFERRED EMBODIMENTS

Referring now to FIG. 3 to FIG. 10, the first embodiment of a method and a system for microphone array input type speech recognition according to the present invention will be described in detail.

Figure 1:
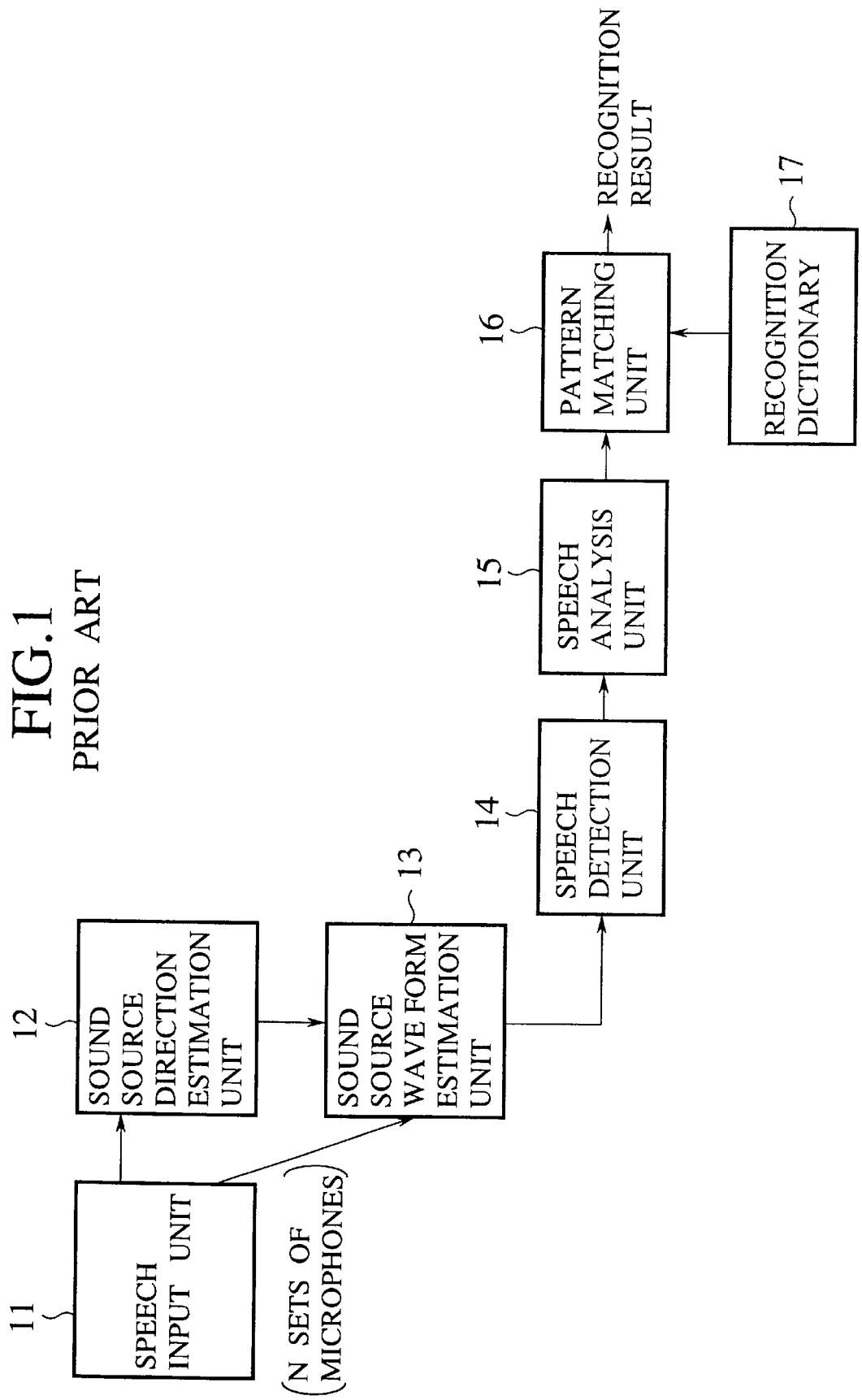
FIG. 1 is a block diagram of a conventional microphone array input type speech recognition system.
Figure 3:
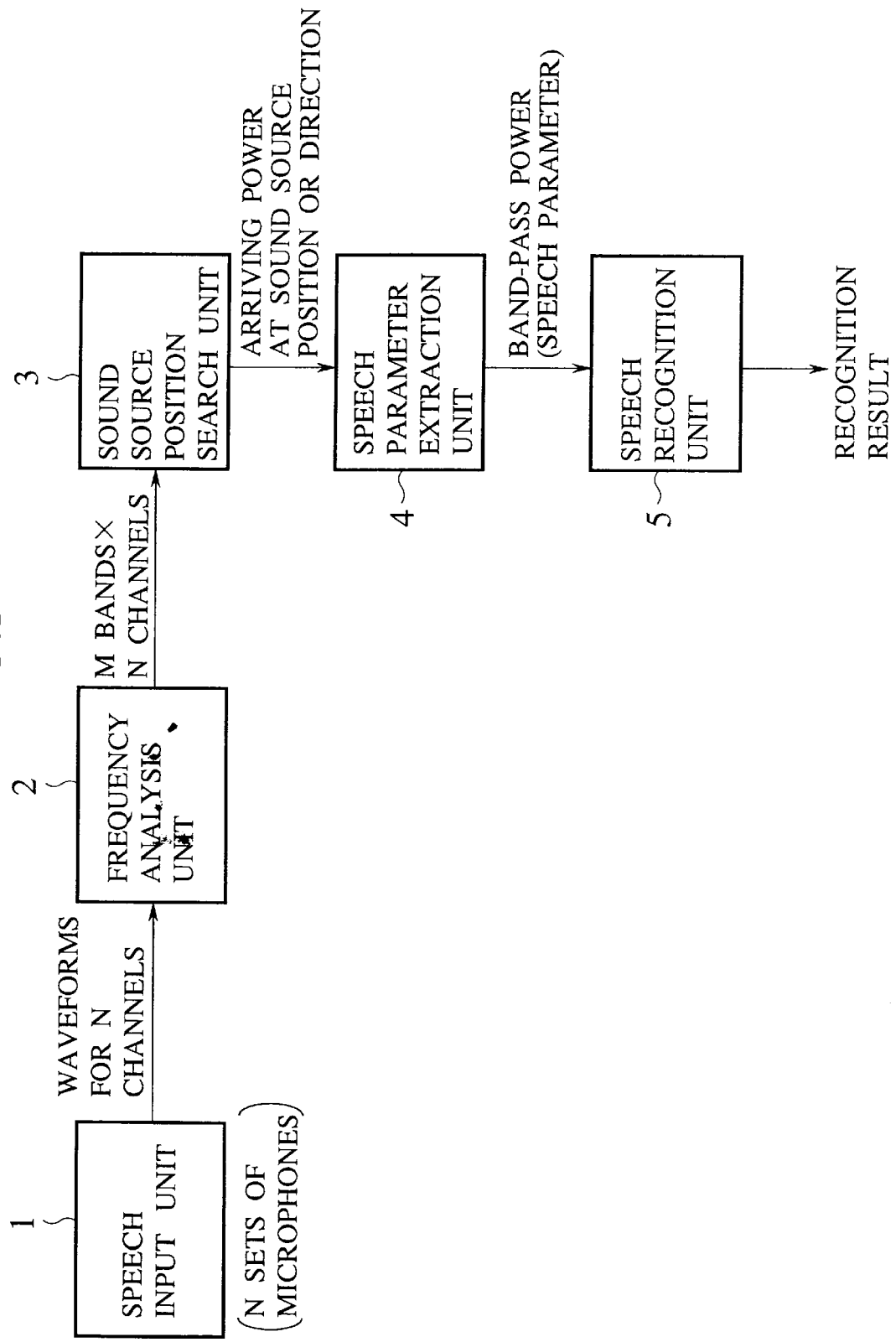
FIG. 3 is a block diagram of a microphone array input type speech recognition system according to the first embodiment of the present invention.

FIG. 3 shows a basic configuration of a microphone array input type speech recognition system in this first embodiment. This speech recognition system of FIG. 1 comprises a speech input unit 1, a frequency analysis unit 2, a sound source position search unit 3, a speech parameter extraction unit 4, and a speech recognition unit 5.

The speech input unit 1 has a microphone array (not shown) formed by N sets (8 sets, for example) of microphones, and converts speeches entered from the microphone array into digital signals.

The frequency analysis unit 2 analyzes the input speech for each microphone (channel) entered at the speech input unit 1 by a band-pass filter bank (a group of band-pass filters), and obtains a band-pass waveform which is a waveform for each frequency bandwidth.

The sound source position search unit 3 estimates a power arriving from each position or direction for each bandwidth according to the band-pass waveform for each frequency bandwidth obtained for each channel by the frequency analysis unit 2, as a sound source position judgement information, and identifies a sound source direction or position by synthesizing the obtained sound source position judgement information for a plurality of frequency bandwidths.

The speech parameter extraction unit 4 extracts the band-pass power of the speech signals arrived from the sound source direction or position identified by the sound source position search unit 3, as a speech parameter, according to the sound source position judgement information obtained at the sound source position search unit 3.

The speech recognition unit 5 carries out the speech recognition by matching the speech parameter extracted by the speech parameter extraction unit 4 with a recognition dictionary.

Now, the outline of the overall operation in the speech recognition system of FIG. 3 will be described.

First, the speeches entered at N (=8) sets of microphones are AD converted at the sampling frequency such as 12 KHz for example, microphone channel by microphone channel, at the speech input unit 1. Then, the frequency analysis is carried out at the frequency analysis unit 2, to obtain band-pass waveforms for a plurality of bands (bandwidths) corresponding to microphones. Here, a number M of bands used in the analysis is assumed to be equal to 16. The transmission bandwidths of the band-pass filters are to be determined as those required at the speech recognition unit 5. A manner of constructing the band-pass filters is well known and can be found in Rabiner et al.: "Fundamentals of Speech Recognition", Prentice Hall, for example.

Next, at the sound source position search unit 3, an arriving power in each bandwidth is estimated for each position or direction, according to the band-pass waveforms for N (=8) channels in each bandwidth outputted by the frequency analysis unit 2, as the sound source position judgement information. This processing is repeated for M (=16) times. This calculation of the sound source position judgement information is a calculation of an arriving power while sequentially displacing an assumed sound source position or direction, so as to obtain a distribution of arriving powers over a range in which the sound source can be located.

Thereafter, the sound wave arriving direction or the sound source position is estimated by synthesizing the above described power distribution obtained for each of M frequency bandwidths. Here, a position or direction with a large value in the power distribution is to be estimated as that of the source source.

In addition, at the speech parameter extraction unit 4, the sound source power (band-pass power) at the sound wave arriving direction or the sound source position is extracted, from the sound source position Judgement information estimated for each bandwidth at the sound source position search unit 3, as the speech parameter. This speech parameter is then given to the speech recognition unit 5, where the speech recognition result is obtained and outputted.

As described, in this first embodiment, the sound source position is determined according to the estimated power distribution for each frequency bandwidth to be used in the speech recognition, and the speech parameter is obtained according to the determined sound source position, so that even when the sound source position is unknown, it is possible to realize the speech recognition by directly obtaining the speech parameter at high precision with a small amount of calculations.

Note that, when the sound source position is known, it suffices to obtain the arriving power value by limiting a power distribution calculation range to a single known sound source position or direction, and the configuration of FIG. 3 is also applicable to this case without any change. This simplified operation is effective when it is possible to assume that a user makes a speech input by approaching to a specific location.

Next, the detailed operation for obtaining the power distribution from a plurality of band-pass waveforms at the sound source position search unit 3 will be described.

At the sound source position search unit 3, in order to obtain a power at each direction or position from a plurality (M sets) of band-pass waveforms, the calculation of the minimum variance method is carried out. The minimum variance method is well known and described in Haykin: "Adaptive Filter Theory", Prentice Hall, for example.

Figure 4:
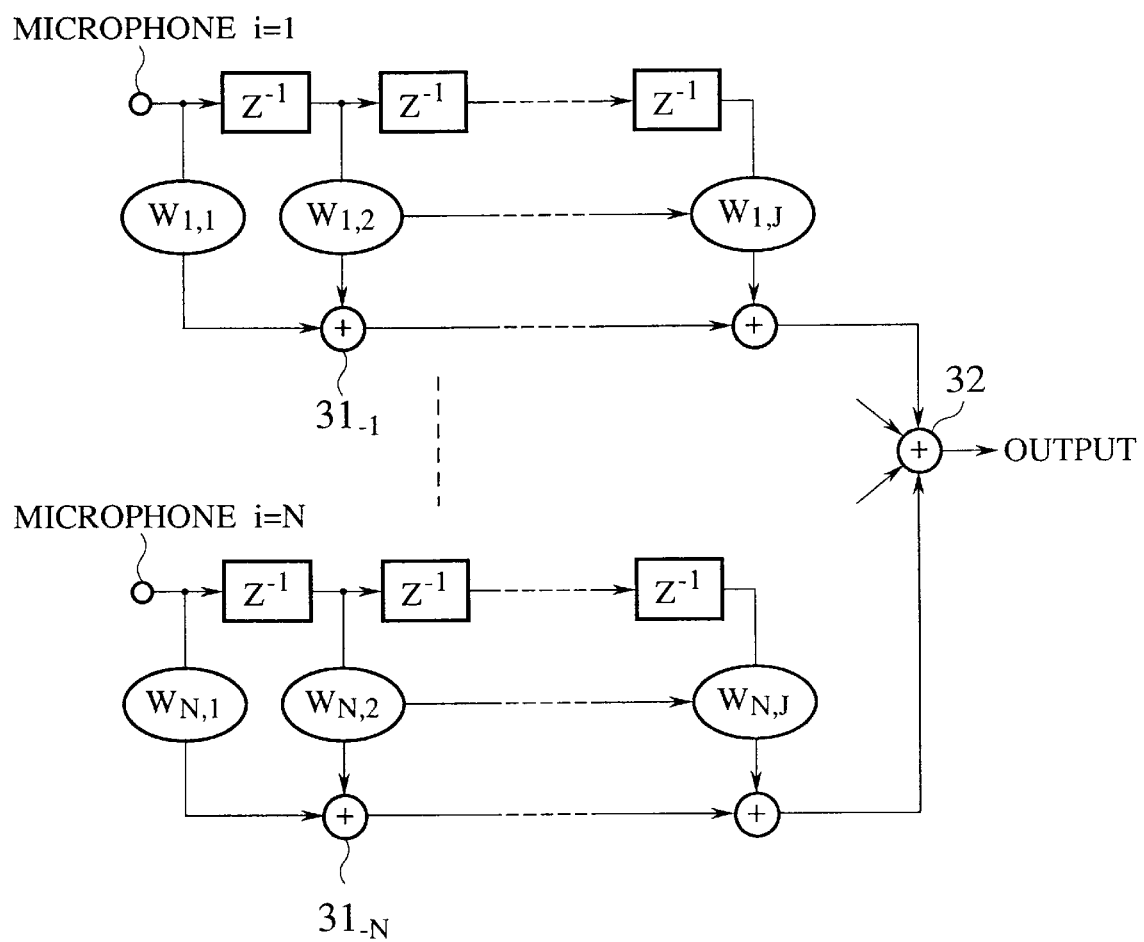
FIG. 4 is a diagram of a filter function to be used in a sound source position search unit in the system of FIG. 3.

In this first embodiment, at a time of the sound source power estimation by the minimum variance method, in order to deal with signals having a certain bandwidth which is not a narrow bandwidth, a filter function as indicated in FIG. 4 is realized by calculation, where the band-pass waveforms of the same frequency bandwidth obtained for N sets of microphones (i=1 to N) by the frequency analysis unit 2 are added by an adder 32 after passing through transversal filters 31-1 to 31-N with multiple delay line taps corresponding to N sets of microphones (i=1 to N). Here, the filter coefficients $w_{11}$ to $w_{1J}$, ..., $w_{N1}$ to $w_{NJ}$ of the filters 31-1 to 31-N are switchably set up for each bandwidth, so as to realize the filter function for all bandwidths.

Figure 2:
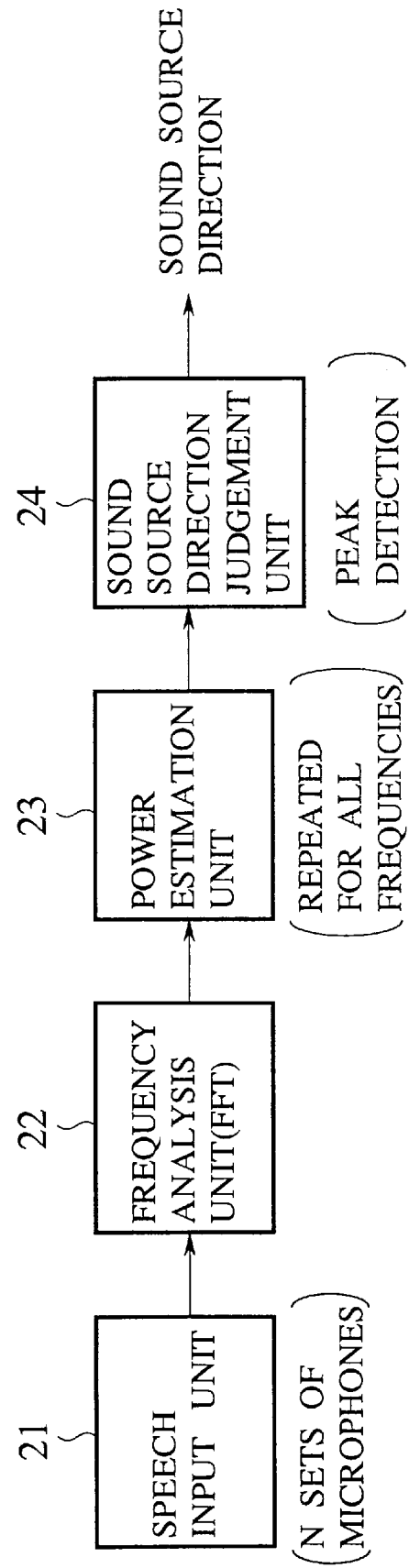
FIG. 2 is a block diagram of a processing configuration for a conventionally proposed parametric method for estimating the sound source position or direction.

In the configuration of FIG. 2, a number of taps in the filter is denoted as J, and a filter coefficient of the i-th microphone (microphone No. i) is denoted as $w_{ij}$ ($1 \leq i \leq N$, $1 \leq j \leq J$). Here, J is equal to 10, for example, but this setting may be be changed depending on a width of the bandwidth.

The filter output y in this configuration of FIG. 2 can be expressed as follows.

First, by denoting the band-pass waveform of the k-th frequency bandwidth ($1 \leq k \leq M$) obtained from the waveform for the i-th microphone as $x_{ik}$ (n), and by arranging band-pass waveform sample sequences: $x_{ik}=(x_{ik}(n-J+1), x_{ik}(n-J+2), \ldots, x_{ik}(n-1), x_{ik}(n))$ from J samples past of a certain time n up to this time n, for all N sets of microphones, it is possible to obtain a vector given by the following equation (1).

$$x_k = (x_{1k}, x_{2k}, \ldots x_{Nk})^T \tag{1}$$

Also, by arranging the filter coefficients $w_{ij}$, it is possible to obtain a vector given by the following equation (2).

$$w_k = (w_{11}, w_{12}, \ldots, w_{1J}, w_{w1}, w_{22}, \ldots, w_{2J}, \ldots, w_{N1}, w_{N2}, \ldots, w_{NJ})^T \tag{2}$$

Using the above equations (1) and (2), the filter output y can be expressed as:

$$y = w_k * x_k \tag{3}$$

where * denotes a complex conjugate of a vector. In this expression, $x_k$ is usually called a snap-shot.

Now, denoting the expectation value as E[ ], the expectation value of the filter output power $y^2$ is expressed as:

$$E[y^2] = E[w_k * x_k * x_k * w_k] = w_k * R_k w_k \tag{4}$$

where $R_k = E[x_k x_k *]$ is a correlation matrix of x. Then, the estimation vector according to the minimum variance method is obtained by minimizing this expectation value $E[y^2]$ under the constraint conditions that a response of the microphone array for a target direction or position is to be maintained constant.

These constraint conditions can be expressed as:

$$w_k * A = g \tag{5}$$

where g is a column vector with constant values in a size equal to a number L of constraint conditions. For example, this g can be [1, 1, ....., 1]. Also, A is a matrix formed by direction control vectors am for different frequencies as column vectors. This matrix A can be expressed as:

$$A = [a_1, a_2, \ldots, a_L] \tag{6}$$

and each direction control vector $a_m$ (m=1, 2, ..., L) can be expressed as:

$$a_m = (1, a_2 e^{-j\omega_m \tau_2}, \ldots, a_N e^{-j\omega_m \tau_N}) \tag{7}$$

where $\tau_2, \ldots, \tau_N$ are propagation time differences of the incident sound wave for the second to N-th microphones with reference to the first microphone, respectively. Note that the propagation time difference $\tau_1$ of the incident sound wave for the first microphone is set equal to zero. Also, $\omega_m$ is an angular frequency, and $a_2, \ldots, a_N$ are amplitude ratio of the incident sound wave for the second to N-th microphone with reference to the first microphone, respectively. Here, L is set equal to 10, for example, and $\omega_m$ is set to be $\omega_m = ((\omega_1 - \omega_b)/(L-1)) * m + \omega_b$, where $\omega_a$ is an upper limit angular frequency of the bandwidth and $\omega_b$ is a lower limit angular frequency of the bandwidth.

When the problem of minimization under the constraints given by the equations (4) and (5) is solved by the Lagrange's method of indeterminate coefficients, the filter coefficient $w_k$ for minimizing the arriving power from any direction or position other than the sound source direction θ or the sound source position θ can be given by the following equation (8).

$$w_k = R_k^{-1} A (A^* R_k^{-1} A)^{-1} g \tag{8}$$

Using this filter coefficient $w_k$, the arriving power (arriving band-pass power, sound source power) $P_k$ (θ) for the k-th bandwidth from the sound source θ can be calculated as the following equation (9).

$$P_k(\theta) = g^* (A^* R_k^{-1} A)^{-1} g \tag{9}$$

In a case of the sound source position estimation, θ is taken as a vector for expressing the coordinates.

Now, with reference to FIGS. 5A and 5B, a manner of obtaining the propagation time difference and the amplitude for each microphone will be described. Here, the explanation is given on two-dimensional plane for the sake of simplicity, but the extension to the three-dimensional space should be obvious.

Figure 5A:
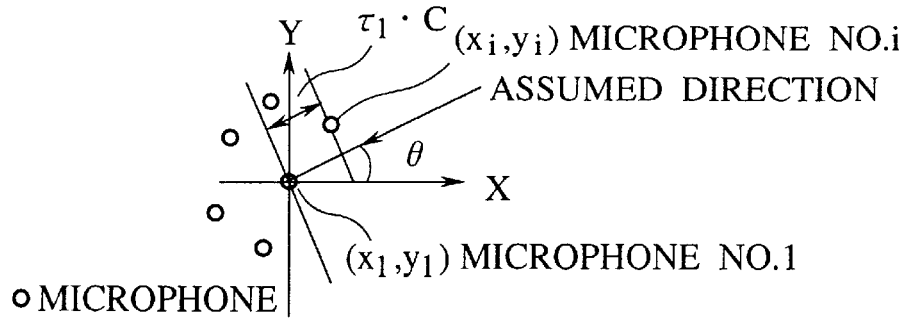
FIGS. 5A and 5B are diagrams showing a relationship between a sound source position and microphone positions in the system of FIG. 3, for a case of direction estimation and for a case of position estimation, respectively.

First, as shown in FIG. 5A, the coordinates of the first microphone (No. 1) are denoted as $(x_1, y_1)$ and the coordinates of the i-th microphone (No. i) are denoted as $(x_i, y_i)$. Then, for a case of the plane waves, when the sound waves are incident from a direction θ, the propagation time difference $\tau_i$ of the incident sound waves at the i-th microphone and the first microphone is given by:

$$\tau_i(\theta) = ((x_i-x_1)^2 + (y_i-y_1)^2)^{1/2} \cos(\theta - \tan^{-1}((y_i-y_1)/(x_i-x_1))) \quad (10)$$

and the amplitude can be assumed as:

$$a_1 = a_2 = \ldots = a_N = 1 \quad (11)$$

Figure 5B:
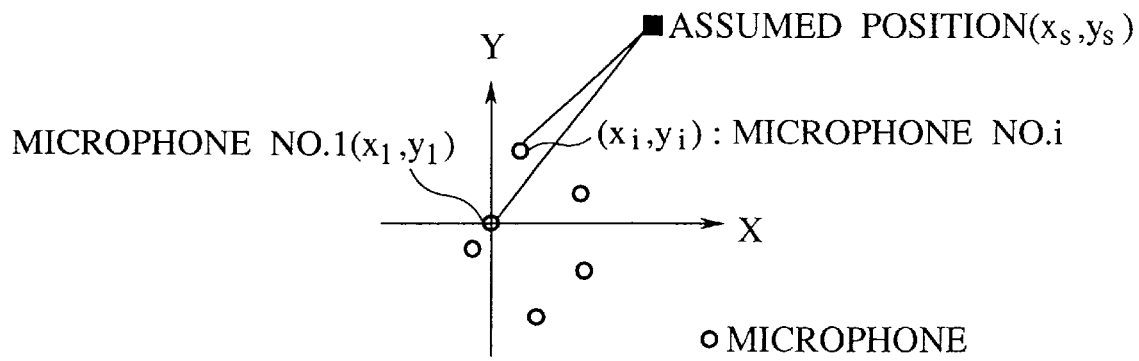

On the other hand, in a case of a point sound source, s shown in FIG. 5B, when an assumed sound source position θ is located at $(x_s, y_s)$, the propagation time difference $\tau_i$ and the amplitude $a_i$ can be given by:

$$\tau\text{hd } i = (((x_i-x_s)^2 + (y_i-y_s)^2)^{1/2} - ((x_1-x_s)^2 + (y_1-y_s)^2)^{1/2})/c \quad (12)$$

and $$a_i = ((x_1-x_s)^2 + (y_1-y_s)^2)^{1/2} / ((x_i-x_s)^2 + (y_i-y_s)^2)^{1/2} \quad (13)$$

where c is the speed of sound.

$P_k(\theta)$ given by the above equation (9) becomes large when θ coincides with the arriving direction or the sound source position, or small when they do not coincide. For this reason, by calculating $P_k(\theta)$ for each direction or position, the arriving direction or the sound source position can be estimated as a position of the peak.

To this end, in a case of obtaining the sound source direction, the sound source position search unit 3 calculates $P_k(\theta)$ while sequentially changing θ gradually, 1° by 1° for example. Also, in a case of obtaining the sound source position, the sound source position search unit 3 calculates $P_k(\theta)$ for lattice points at 2 cm interval for example, within the search range. The increment value for θ may be changed to any appropriate value depending on factors such as a wavelength and a distance to an assumed sound source position.

Next, at the sound source position search unit 3, $P_k(\theta)$ of the equation (9) obtained for all bandwidths are synthesized to estimate the sound source position or the sound source direction.

Here, the synthesizing can be realized by multiplying a weight $W_k$ to the arriving power distribution $P_k(\theta)$ for each bandwidth, and taking a sum for all the frequency bandwidths from k=1 to k=M, that is:

$$P(\theta)_{total} = \Sigma W_k P_k(\theta) \quad (14)$$

and estimating the sound source from a peak on the distribution after this synthesizing processing (the total sound source power distribution).

Here, all the weights $W_k$ may be set equal to 1, or the weight for the frequency of a noise source with a known frequency characteristic such as a power source frequency may be set small so as to reduce the influence of the noise.

Figure 6:
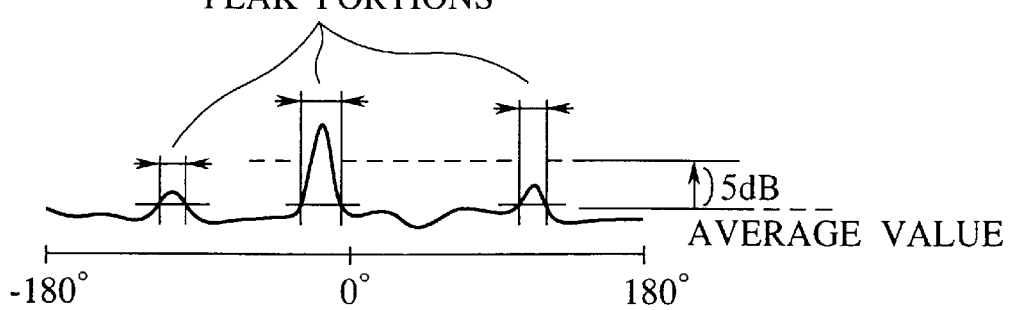
FIG. 6 is a diagram for explaining a peak detection from a sound source power distribution after the synthesizing processing in the system of FIG. 3.

The detection of the sound source is carried out according to a size of a peak in $P(\theta)_{total}$ as described above, and a single largest peak can be detected as the sound source. Alternatively, as shown in FIG. 6, by setting a prescribed threshold with reference to an average value of portions other than peak portions on the synthesized (total) sound source power distribution, such as 5 dB, and all peaks above this threshold may be detected as the sound sources, while not detecting any sound source at all when there is no peak above this threshold.

In this manner, the arriving power distribution $P_k(\theta)$ for each bandwidth given by the equation (9) is used in judging whether the sound source exists at an assumed sound source position which is set to be each direction or position determined with reference to positions of a plurality of microphones, so that this arriving power distribution $P_k(\theta)$ will be referred to as the sound source position judgement information.

Next, the speech parameter extraction unit 4 can extract the power of the k-th frequency bandwidth of the sound source, from the already obtained arriving power distribution $P_k(\theta)$ for each bandwidth, according to the sound source direction or position obtained by the sound source position search unit 3. Consequently, by extracting the power for all the bandwidths from k=1 to k=M, it is possible to obtain the band-pass power to be used as the speech parameter.

The band-pass power of the sound source obtained in this manner is sent from the speech parameter extraction unit 4 to the speech recognition unit 5, and used in the speech recognition processing.

Figure 7:
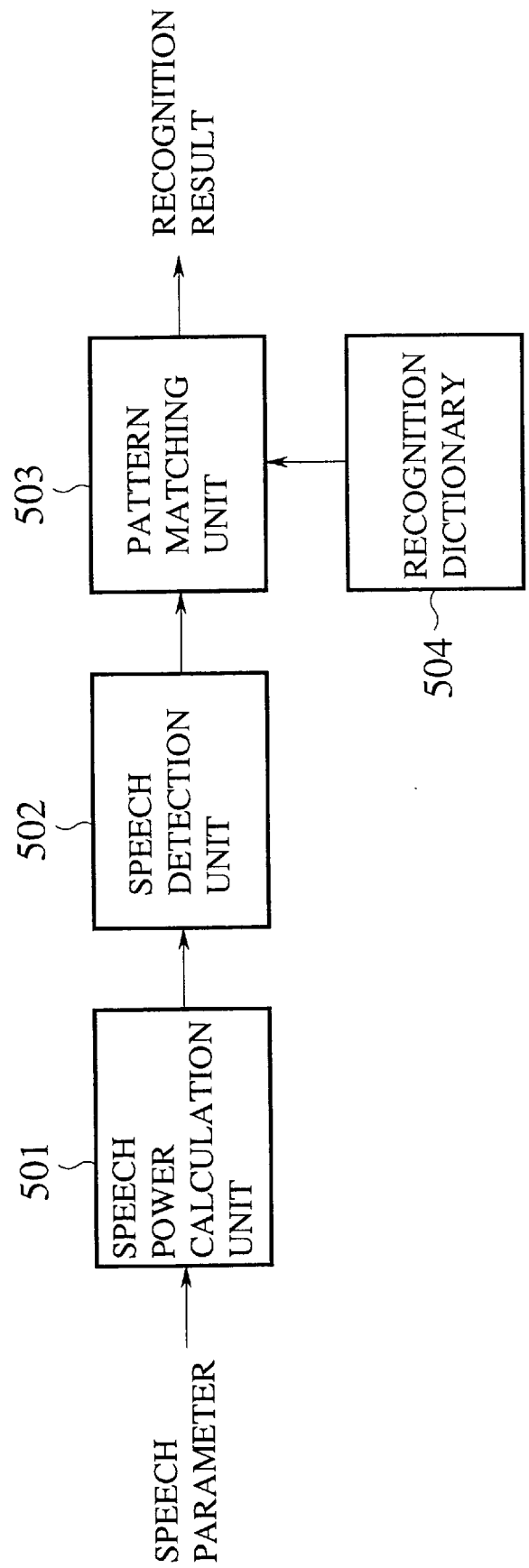
FIG. 7 is a block diagram of one exemplary configuration for a speech recognition unit in the system of FIG. 3.

As shown in FIG. 7, the speech recognition unit 5 comprises a speech power calculation unit 501, a speech detection unit 502, a pattern matching unit 503, and a recognition dictionary 504.

In this speech recognition unit 5, the speech power is calculated from the speech parameter (band-pass power) extracted by the speech parameter extraction unit 4, and a speech section is detection by the speech detection unit 502 according to the calculated speech power. Then, for the speech parameter in the detected speech section, the pattern matching with the recognition dictionary 504 is carried out by the pattern matching unit 503.

Figure 8:
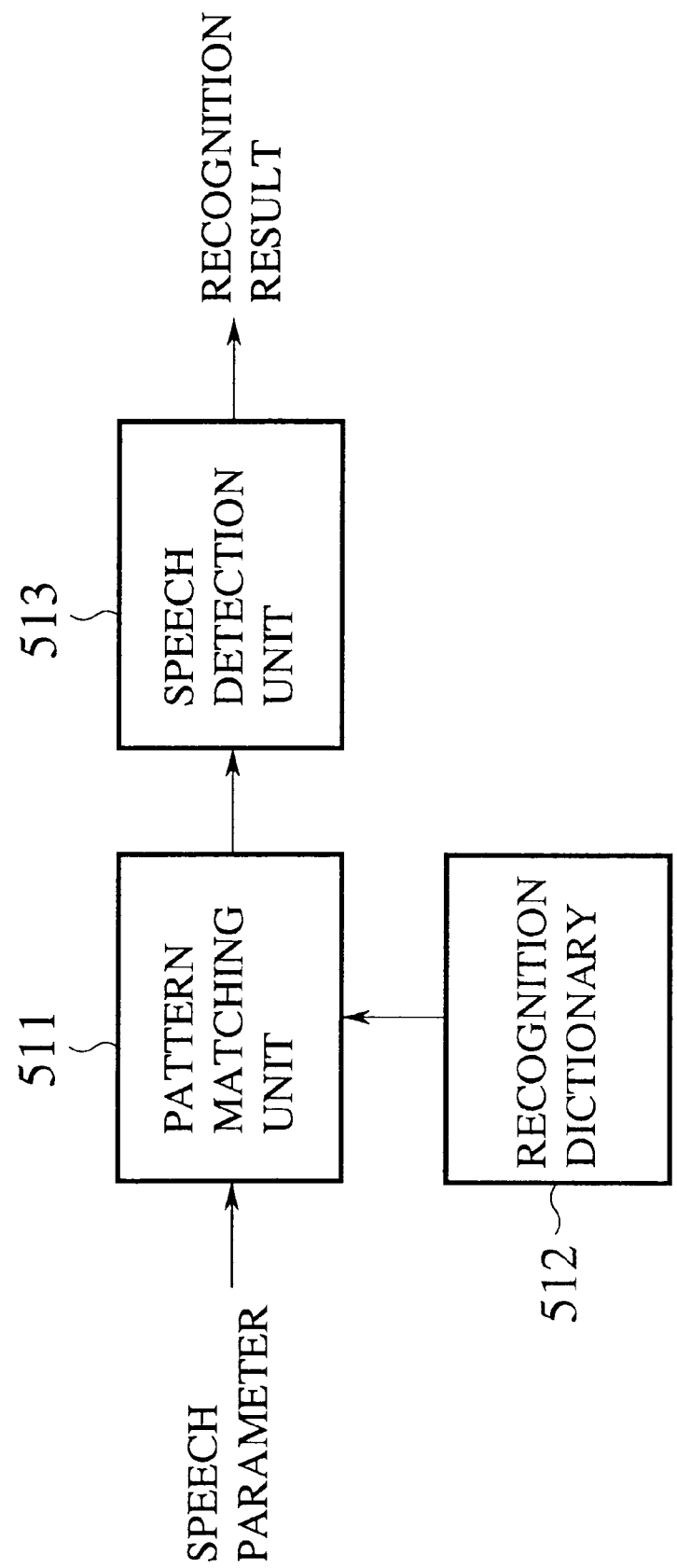
FIG. 8 is a block diagram of another exemplary configuration for a speech recognition unit in the system of FIG. 3.

Note that, as shown in FIG. 8, the speech recognition unit 5 may be formed by a pattern matching unit 511, a recognition dictionary 512, and a speech detection unit 513, so as to carry out the word spotting scheme in which the continuous pattern matching for the speech parameter is carried out and a section with the largest matching score is determined as a speech section.

The total speech power can be obtained by summing powers for all the bandwidths extracted by the speech parameter extraction unit 4, so that it is possible to use the known speech section detection method based on the speech power as disclosed in L. F. Lamel et al.: "An Improved Endpoint Detector for Isolated Word Recognition", IEEE Transactions on Acoustics, Speech, and Signal Processing, Vol.ASSP-29, No. 4, pp. 777–785, August 1981. The above processing is to be carried out for each frame of the input speech waveform data so as to recognize the speech continuously.

In this first embodiment, using the configuration of the microphone array input type speech recognition system as described above, the speech recognition is realized by directly obtaining the band-pass power which is the speech parameter. Consequently, it is possible to use the minimum variance method which is a sound source direction or sound source position estimation method with a high precision and a small amount of calculations.

Figure 9:
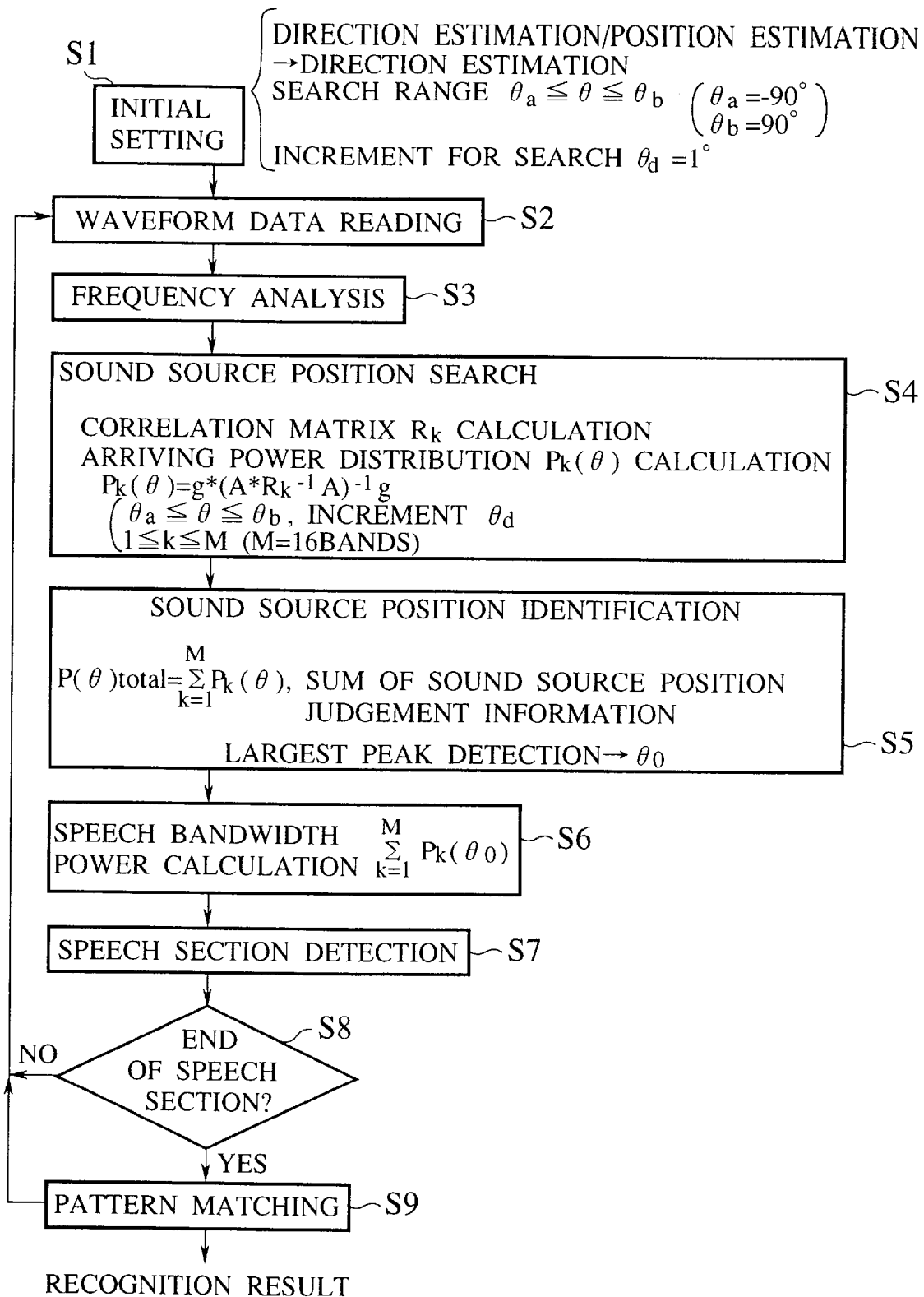
FIG. 9 is a flow chart for the overall processing in the system of FIG. 3.

Now, the flow of processing as described above will be summarized with reference to the flow chart of FIG. 9.

First, prior to the start of the processing, the initial setting is made for factors such as whether a direction estimation is to be used or a position estimation is to be used, a range of sound source search to be used, and an increment value to be used in the search (step S1). In an example of FIG. 9, a direction estimation is to be used, a searching range is from −90° to +90°, and an increment value for search is 1°.

Next, the speeches entered at N sets of microphones are A/D converted at the sampling frequency of 12 KHz for example, for all N channels in parallel, by the speech input unit 1. The obtained waveform data are then stored in a buffer (not shown) of the speech input unit 1 (step 52). Normally, this step S2 is carried out continuously in real time, regardless of the other processing.

Next, the waveform data for each channel is read out from the buffer for one frame size, 256 points for example, and applied to the band-pass filter bank at the frequency analysis unit 2, so as to extract the band-pass waveform for each frequency bandwidth k (k=1 to M), where M=16 in this example (step S3). Here, the calculations for the band-pass filters may be carried out independently for each microphone in parallel, or sequentially for each microphone serially.

Figure 10:
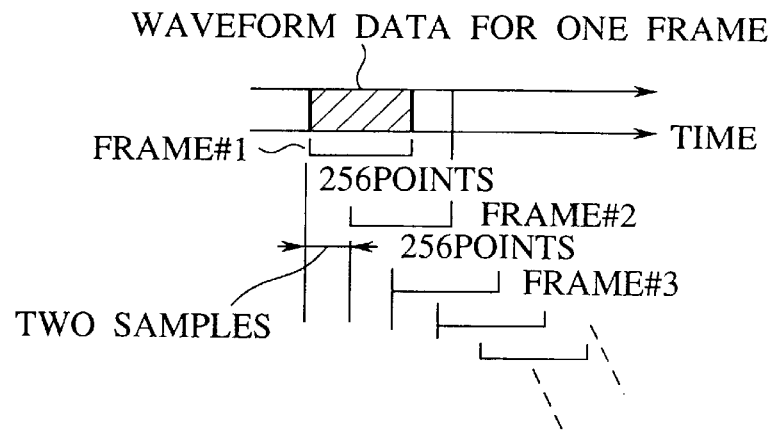
FIG. 10 is a diagram for explaining a read out waveform data for one frame used in a calculation of a correlation matrix at a sound source position search unit in the system of FIG. 3.

Next, at the source source position search unit 3, using the band-pass waveform data for N channels obtained by the frequency analysis unit 2 at the step S3, the correlation matrix $R_k$ for each frequency bandwidth k is obtained (step S4). Here, as shown in FIG. 10, the calculation of the correlation matrix $R_k$ is realized by obtaining the correlation matrix $R_k$ as a time average of the auto-correlation matrices of samples for 20 frames taken at an interval of 2 samples from a frame data of 256 samples (points) for example.

In addition, at the step S4, using this correlation matrix $R_k$, the arriving power distribution $Pk(\theta)=g^* (A^* R_k^{-1} A)^{-1} g$ is obtained as the sound source position judgement information for each assumed position or direction. This calculation is carried out over the entire space to be searched through, so as to obtain the spatial distribution of the arriving powers. As for the bandwidths, when M=16, the calculation is carried out from k=1 to k=16.

Next, at the sound source position search unit 3, the arriving power distributions $P_k(\theta)$ for different frequency bandwidths are summed over the entire frequency bandwidths, for each θ, so as to obtain the total sound source power distribution $P(\theta)_{total}$. Then, the largest peak is extracted from this $P(\theta)_{total}$ and identified as the sound source position $\theta_0$ (step S5).

Next, at the speech parameter extraction unit 4, a value on the arriving power distribution (sound source position judgement information distribution) $P_k(\theta)$ for each frequency bandwidth obtained by the sound source position search unit 3 at the sound source position $\theta_0$ is extracted, and this is repeated for all the frequency bandwidths for each sound source, so as to obtain the speech parameter $P_k(\theta_0)$ (step S6).

In addition, at the step S6, the powers for different bandwidths k of the speech parameter $P_k(\theta)$ are summed to obtain the power for the entire speech bandwidth at the speech power calculation unit 501 of the speech recognition unit 5.

Next, using the power for the entire speech bandwidth obtained at the step S6, the speech section is detected by the speech detection unit 502 of the speech recognition unit 5 (step S7).

Then, whether the end of the speech section is detected by the speech detection unit 502 or not is judged (step S8), and if not, the processing returns to the step S2 to carry out the frequency analysis for the next waveform data frame.

On the other hand, when the end of the speech section is detected, a matching of the speech parameter in the detected speech section with the recognition dictionary 504 is carried out, and the obtained recognition result is outputted (step S9). Then, the processing returns to the step S2 to carry out the frequency analysis for the next waveform data frame.

Thereafter, the above processing is repeated so as to carry out the speech parameter estimation and the speech recognition continuously.

Note that the processing described above can be carried out at high speed by adopting the pipeline processing using a plurality of processors (as many processors as a number of microphones, for example) which are operated in parallel.

Referring now to FIG. 11A to FIG. 13, the second embodiment of a method and a system for microphone array input type speech recognition according to the present invention will be described in detail.

This second embodiment is directed to a scheme for further reducing an amount of calculations in the sound source position estimation, by changing the constraint conditions used in the spectrum estimation so as to control the resolution, and changing the search density according to the resolution so as to reduce an amount of calculation in the sound source search. In this second embodiment, the basic configuration of the speech recognition system is the same as that of the first embodiment, so that FIG. 3 will be also referred in the following description.

In the first embodiment described above, the constraint conditions used in the spectrum estimation based on the minimum variance method are that a response of the microphone array for one direction or position is to be maintained constant. In this case, the resolution of the estimation is sufficiently high, so that the peak is found by the dense search in which the arriving power is obtained while changing θ 1° by 1° for example within the sound source search range.

Figure 11A:
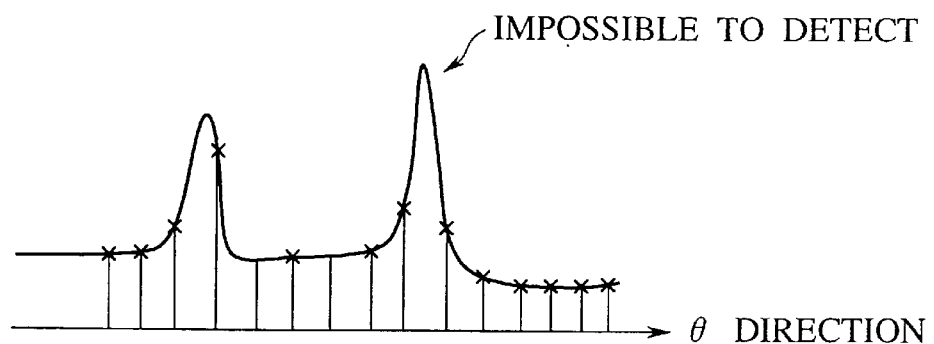
FIGS. 11A and 11B are diagrams showing a relationship between a resolution and an increment value for search in a sound source position estimation in the system of FIG. 3.

When the resolution is so high as in this case, as shown in FIG. 11A, there is a possibility for failing to detect an accurate apex of the peak when the search is carried out not so densely, so that an amount of calculations for the search cannot be reduced easily.

Figure 11B:
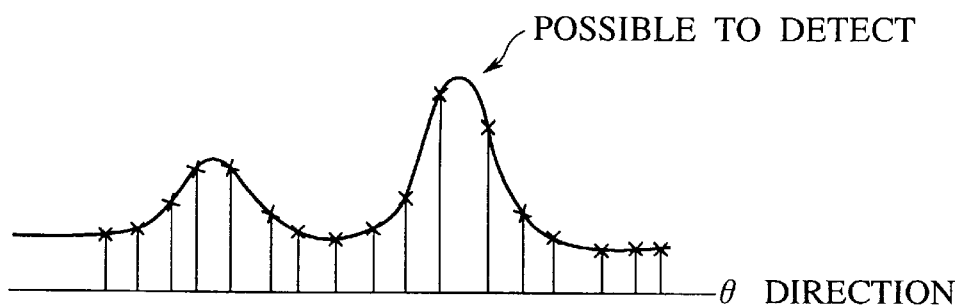

In contrast, when the resolution of the sound source position estimation processing can be lowered, as shown in FIG. 11B, a possibility for overlooking the peak position can be made low even when the search is carried out coarsely, so that an amount of calculations can be reduced. In this case, however, it may not be possible to separate the closely located sound sources, or the estimation precision may be lowered, as much as the resolution is lowered.

For this reason, this second embodiment adopts a scheme in which the lower resolution search is carried out first and then the high resolution search is carried out only in a vicinity of the peak, so as to realize the high precision sound source position estimation with a small amount of calculations. This scheme will now be described in detail.

The resolution at a time of the sound source position estimation can be controlled by requiring that responses of the microphone array for a plurality of directions or positions are to be simultaneously maintained constant, instead of just requiring a response of the microphone array for one direction or position to be maintained constant as in the constraint conditions of the equation (5).

For example, using two time delays $\tau_1 (\theta_1)$ and $\tau_2 (\theta_2)$ for two angles $\theta_1$ and $\theta_2$ (according to the equation (10)), it is possible to use two direction control vectors $a_m (\theta_1)$ and $a_m (\theta_2)$ (m=1, 2, . . . , L) given by the following equations (15) and (16).

$$a_m(\theta_1)=(1, a_2 e^{-j\omega_m \tau_2(\theta_1)}, \ldots, a_N e^{-j\omega_m \tau_N(\theta_1)}) \quad (15)$$

$$a_m(\theta_2)=(1, a_2 e^{-j\omega_m \tau_2(\theta_2)}, \ldots, a_N e^{-j\omega_m \tau_N(\theta_2)}) \quad (16)$$

Then, using these two direction control vectors $a_m(\theta_1)$ and $a_m(\theta_2)$, it is possible to set:

$$A=[a_1(\theta_1), a_2(\theta_1), \ldots, a_L(\theta_1), a_1(\theta_2), a_2(\theta_2), \ldots, a_L(\theta_2)] \quad (17)$$

so as to make responses of the microphone array to two directions simultaneously.

Here, when $\theta_1$ and $\theta_2$ are set to close values, such as $\theta_2=\theta_1+1°$ for example, it is equivalent to a case of making a response of the microphone array for a single direction with a width between $\theta_1$ and $\theta_2$, so that it is equivalent to the lowering of the resolution. Note here that a number of directions for which the responses of the microphone array are to be made simultaneously is not necessarily limited to two.

When the resolution is lowered, the search can be coarser compared with a case of high resolution, so that an amount of calculations can be reduced.

Then, after the search using the low resolution sound source position estimation processing described above, the high resolution search as described in the first embodiment can be carried out only in a vicinity of the peak detected by the first search, so that the high precision sound source position estimation can be realized with a reduced amount of calculations overall.

Figure 12:
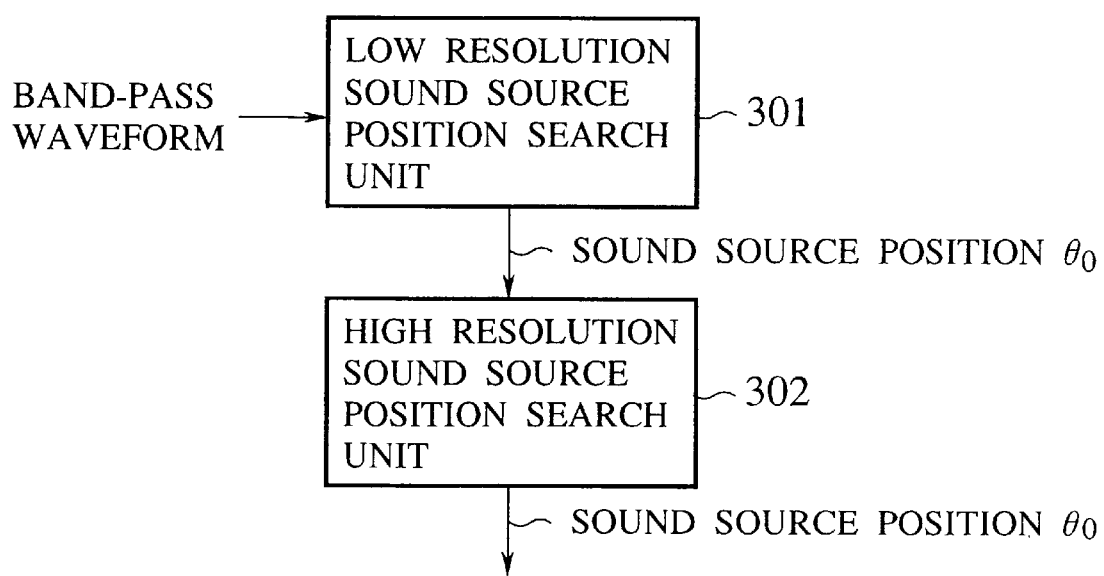
FIG. 12 is a block diagram of a sound source position search unit in the system of FIG. 3 according to the second embodiment of the present invention.

FIG. 12 shows a configuration of the sound source position search unit 3 in this second embodiment for realizing the above described sound source position estimation processing.

In this configuration of FIG. 12, the sound source position search unit 3 comprises a low resolution sound source position search unit 301 and a high resolution sound source position search unit 302. The low resolution sound source position search unit 301 coarsely estimates the arriving power distribution in terms of positions or directions by using the low resolution spectrum estimation. The high resolution sound source position search unit 302 densely estimates the arriving power distribution by using the high resolution spectrum estimation only in a vicinity of the position or direction obtained by the low resolution sound source position search unit 301.

Now, the flow of processing in this sound source position search unit 3 in the configuration of FIG. 12 will be described with reference to the flow chart of FIG. 13.

First, using the inputs of the band-pass waveforms corresponding to the microphone, the correlation matrix $R_k$ is calculated (step S11). Here, a method for obtaining this correlation matrix $R_k$ is the same as in the first embodiment.

Next, using the obtained correlation matrix $R_k$, the low resolution sound source position search is carried out (step S12). At this point, the increment value $\theta_d$ for search is set to be a relatively large value, such as 5° for example, so as to carry out the search coarsely over the entire search range. Also, in order to lower the resolution, a matrix as expressed by the equation (17) which has two direction control vectors $a_m(\theta_1)$ and $a_m(\theta_2)$ for two directions or positions as expressed by the equations (15) and (16) as column vectors is used instead of a matrix A in the equation (9). In FIG. 13, this matrix is denoted as B in order to distinguish it from a matrix A of the equation (6). The search is carried out for each bandwidth.

Next, the low resolution arriving power distributions for different bandwidths are synthesized, and the sound source position $\theta_0$ is obtained from a peak therein (step S13).

Next, in a vicinity of the sound source position obtained at the step S13, the high resolution sound source position search is carried out. Here, the setting of the search range is set to be ±10° of the sound source position obtained at the step S13, for example. At this point, the equation to be used for the arriving power estimation (arriving power distribution) is the same as the equation (9), and the increment value is set to a smaller value such as 1° for example (step S14).

Next, the high resolution arriving power distributions for different bandwidths obtained at the step S14 are synthesized, and the sound source position $\theta_0'$ is obtained from a peak therein (step S15).

At the speech parameter extraction unit 4, the power (speech parameter) of the sound source is extracted from the arriving power distribution obtained by the high resolution sound source position search at the high resolution sound source position search unit 302 of the sound source position search unit 3.

As described, in this second embodiment, by using the sound source position search processing in which the low resolution sound source position estimation and the high resolution sound source position estimation are combined, it is possible to estimate the sound source position and its band-pass power while reducing an amount of calculations considerably.

As described, according to the present invention, a band-pass waveform which is a waveform for each frequency bandwidth is obtained from input signals of the microphone array, and a band-pass power of the sound source is directly obtained from the band-pass waveform, so that it is possible to realize a high precision sound source position or direction estimation by a small amount of calculations. Moreover, the obtained band-pass power can be used as the speech parameter so that it is possible to realize a high precision speech recognition.

In the speech recognition system of the present invention, the input signals of the microphone array entered by the speech input unit are frequency analyzed by the frequency analysis unit, so as to obtain the band-pass waveform which is a waveform for each frequency bandwidth. This band-pass waveform is obtained by using the band-pass filter band (a group of band-pass filters), instead of using the frequency analysis based on FFT as in the conventional speech recognition system. Then, the band-pass power of the sound source is directly obtained from the obtained band-pass waveform by the sound source position search unit.

Here, in order to handle signals within some bandwidth collectively, a filter configuration (filter function) having a plurality of delay line taps for each microphone channel is used and the sound source power is obtained as a sum of the filter outputs for all channels, while using the minimum variance method which is a known high precision spectrum estimation method.

The sound source power estimation processing using the minimum variance method is also used in the conventionally proposed parametric method described above, but a use of only one delay line tap has been assumed conventionally, so that it has been impossible to obtain the bandwidth power collectively.

In contrast, in the speech recognition system of the present invention, a filter configuration with a plurality of delay line taps is used so that the power in each direction or position is obtained for each frequency bandwidth necessary for the speech recognition, rather than obtaining the power in each direction or position for each frequency, and therefore the obtained power can be directly used for the speech recognition while a required amount of calculations can be reduced.

For example, in a case of using the conventional FFT with 512 points, it has been necessary to repeatedly obtain the power in each direction for each of 256 components, but in the present invention, when a number of bands in the band-pass filter bank is set to 16 for example, it suffices to estimate the power in each direction for 16 times. In addition, this power (band-pass power) can be estimated at higher precision compared with the conventional case of using the delay sum array processing, so that it is possible to realize the high precision speech recognition.

In the sound source position search unit, the synthesizing of the band-pass power distributions for a plurality of frequency bandwidths can be realized by multiplying respective weights to the band-pass power distributions of different bandwidths, and taking a sum of the weighted band-pass power distributions for all the frequency bandwidths. Here, all the weights may be set equal to 1, or the weight for the frequency of a noise source with a known frequency characteristic such as a power source frequency may be set small so as to reduce the influence of the noise.

Also, in the sound source position search unit, the estimation of the sound source position or direction from the synthesized power distribution for each position or direction can be realized by detecting a peak in the synthesized power distribution and setting a position or direction corresponding to the detected peak as the sound source position or direction.

Furthermore, according to the present invention, by using a sound source position search processing in which a low resolution position estimation and a high resolution position estimation are combined, it is possible to realize the sound source estimation and the band-pass power estimation at high precision while further reducing an amount of calculations.

In this case, the coarse search carried out by the sound source position search unit for the purpose of reducing an amount of calculations is the low resolution search so that it is possible to malke it highly unlikely to overlook the sound source position or direction (a peak position in the power distribution).

Although there is a possibility for being unable to separate closely located sound sources or lowering the estimation precision by the low resolution search alone, the high resolution search is also carried out only in a vicinity of the sound source position or direction obtained by the low resolution search (in a vicinity of the detected peak), so that it is possible to realize the high precision sound source position estimation with a further reduced amount of calculations.

It is to be noted that, in the above description, the speech recognition system having a speech recognition unit has been described, but the speech parameter extraction technique according to the present invention can be utilized separately from the speech recognition device.

Namely, it is also possible to provide a microphone array input type speech analysis system for analyzing the input signals of the microphone array and extracting the speech parameter, which is formed by the speech input unit, the frequency analysis unit, the sound source position search unit, and the speech parameter extraction unit substantially as described above, in which the band-pass waveform which is a waveform for each frequency bandwidth is obtained from input signals of the microphone array, a band-pass power of the sound source is directly obtained from the band-pass waveform, and the obtained band-pass power is used as the speech parameter.

Similarly, it is also possible to provide a microphone array input type speech analysis system for analyzing the input signals of the microphone array and estimating the sound source position or direction, which is formed by the speech input unit, the frequency analysis unit, and the sound source position search unit substantially as described above, in which the band-pass waveform which is a waveform for each frequency bandwidth is obtained from input signals of the microphone array, a band-pass power of the sound source is directly obtained from the band-pass waveform, and the sound source position or direction is estimated according to a synthesized band-pass power distribution.

Such a microphone array input type speech analysis system according to the present invention is utilizable not only in the speech recognition but also in the other speech related processing such as a speaker recognition.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A microphone array input type speech recognition system, comprising:

a speech input unit for inputting speeches in a plurality of channels using a microphone array formed by a plurality of microphones;

a frequency analysis unit for analyzing an input speech of each channel inputted by the speech input unit, and obtaining band-pass waveforms for each channel, each band-pass waveform being a waveform for each frequency bandwidth;

a sound source position search unit for calculating a band-pass power distribution for each frequency bandwidth from the band-pass waveforms for each frequency bandwidth obtained by the frequency analysis unit, synthesizing calculated band-pass power distributions for a plurality of frequency bandwidths, and estimating a sound source position or direction from a synthesized band-pass power distribution;

a speech parameter extraction unit for extracting a speech parameter for speech recognition, from the band-pass power distribution for each frequency bandwidth calculated by the sound source position search unit, according to the sound source position or direction estimated by the sound source position search unit; and a speech recognition unit for obtaining a speech recognition result by matching the speech parameter extracted by the speech parameter extraction unit with a recognition dictionary.

2. The system of claim 1, wherein the sound source position search unit includes:

a low resolution sound source position estimation unit for estimating a rough sound source position or direction, by minimizing an output power of the microphone array under constraints that responses of the microphone array for a plurality of directions or positions are to be maintained constant; and a high resolution sound source position estimation unit for estimating an accurate sound source position or direction in a vicinity of the rough sound source position or direction estimated by the low resolution sound source position estimation unit, by minimizing the output power of the microphone array under constraints that a response of the microphone array for one direction or position is to be maintained constant, wherein the speech parameter extraction unit extracts the speech parameter for speech recognition according to the accurate sound source position or direction.

3. The system of claim 1, wherein the frequency analysis unit obtains the band-pass waveforms for each channel by using a band-pass filter bank.

4. The system of claim 1, wherein the sound source position search unit calculates the band-pass power distribution for each frequency bandwidth, by calculating a band-pass power for each frequency bandwidth, in each one of a plurality of assumed sound source positions or directions within a prescribed search range.

5. The system of claim 1, wherein the sound source position search unit calculates the band-pass power distribution for each frequency bandwidth by using a filter function configuration having a plurality of delay line taps for each channel.

6. The system of claim 1, wherein the sound source position search unit calculates the band-pass power distribution for each frequency bandwidth by using a minimum variance method for minimizing an output power of the microphone array under constraints that a response of the microphone array for one direction or position is to be maintained constant.

7. The system of claim 1, wherein the speech parameter extraction unit extracts the band-pass power distribution for each frequency bandwidth calculated by the sound source position search unit for the sound source position or direction estimated by the sound source position search unit directly as the speech parameter.

8. The system of claim 1, wherein the sound source position search unit synthesizes the calculated band-pass power distributions for a plurality of frequency bandwidths by weighting the calculated band-pass power distributions with respective weights, and summing weighted band-pass power distributions.

9. The system of claim 1, wherein the sound source position search unit estimates the sound source position or direction by detecting a peak in the synthesized band-pass power distribution and setting a position or direction corresponding to a detected peak as the sound source position or direction.

10. A microphone array input type speech analysis system, comprising:

a speech input unit for inputting speeches in a plurality of channels using a microphone array formed by a plurality of microphones;

a frequency analysis unit for analyzing an input speech of each channel inputted by the speech input unit, and obtaining band-pass waveforms for each channel, each band-pass waveform being a waveform for each frequency bandwidth;

a sound source position search unit for calculating a band-pass power distribution for each frequency bandwidth from the band-pass waveforms for each frequency bandwidth obtained by the frequency analysis unit, synthesizing calculated band-pass power distributions for a plurality of frequency bandwidths, and estimating a sound source position or direction from a synthesized band-pass power distribution; and a speech parameter extraction unit for extracting a speech parameter from the band-pass power distribution for each frequency bandwidth estimated by the sound source position search unit, according to the sound source position or direction estimated by the sound source position search unit.

11. The system of claim 10, wherein the sound source position search unit includes:

a low resolution sound source position estimation unit for estimating a rough sound source position or direction, by minimizing an output power of the microphone array under constraints that responses of the microphone array for a plurality of directions or positions are to be maintained constant; and a high resolution sound source position estimation unit for estimating an accurate sound source position or direction in a vicinity of the rough sound source position or direction estimated by the low resolution sound source position estimation unit, by minimizing the output power of the microphone array under constraints that a response of the microphone array for one direction or position is to be maintained constant, wherein the speech parameter extraction unit extracts the speech parameter according to the accurate sound source position or direction.

12. A microphone array input type speech analysis system, comprising:

a speech input unit for inputting speeches in a plurality of channels using a microphone array formed by a plurality of microphones;

a frequency analysis unit for analyzing an input speech of each channel inputted by the speech input unit, and obtaining band-pass waveforms for each channel, each band-pass waveform being a waveform for each frequency bandwidth; and a sound source position search unit for calculating a band-pass power distribution for each frequency bandwidth from the band-pass waveforms for each frequency bandwidth obtained by the frequency analysis unit, synthesizing calculated band-pass power distributions for a plurality of frequency bandwidths, and estimating a sound source position or direction from a synthesized band-pass power distribution.

13. The system of claim 12, wherein the sound source position search unit includes:

a low resolution sound source position estimation unit for estimating a rough sound source position or direction, by minimizing an output power of the microphone array under constraints that responses of the microphone array for a plurality of directions or positions are to be maintained constant; and a high resolution sound source position estimation unit for estimating an accurate sound source position or direction in a vicinity of the rough sound source position or direction estimated by the low resolution sound source position estimation unit, by minimizing the output power of the microphone array under constraints that a response of the microphone array for one direction or position is to be maintained constant.

14. A microphone array input type speech recognition method, comprising the steps of:

inputting speeches in a plurality of channels using a microphone array formed by a plurality of microphones;

analyzing an input speech of each channel inputted by the inputting step, and obtaining band-pass waveforms for each channel, each band-pass waveform being a waveform for each frequency bandwidth;

calculating a band-pass power distribution for each frequency bandwidth from the band-pass waveforms for each frequency bandwidth obtained by the analyzing step, synthesizing calculated band-pass power distributions for a plurality of frequency bandwidths, and estimating a sound source position or direction from a synthesized band-pass power distribution;

extracting a speech parameter for speech recognition, from the band-pass power distribution for each frequency bandwidth calculated by the calculating step, according to the sound source position or direction estimated by the calculating step; and obtaining a speech recognition result by matching the speech parameter extracted by the extracting step with a recognition dictionary.

15. The method of claim 14, wherein the calculating step includes the steps of:

a low resolution sound source position estimation step for estimating a rough sound source position or direction, by minimizing an output power of the microphone array under constraints that responses of the microphone array for a plurality of directions or positions are to be maintained constant; and a high resolution sound source position estimation step for estimating an accurate sound source position or direction in a vicinity of the rough sound source position or direction estimated by the low resolution sound source position estimation step, by minimizing the output power of the microphone array under constraints that a response of the microphone array for one direction or position is to be maintained constant, wherein the extracting step extracts the speech parameter for speech recognition according to the accurate sound source position or direction.

16. The method of claim 14, wherein the analyzing step obtains the band-pass waveforms for each channel by using a band-pass filter bank.

17. The method of claim 14, wherein the calculating step calculates the band-pass power distribution for each frequency bandwidth, by calculating a band-pass power for each frequency bandwidth, in each one of a plurality of assumed sound source positions or directions within a prescribed search range.

18. The method of claim 14, wherein the calculating step calculates the band-pass power distribution for each frequency bandwidth by using a filter function configuration having a plurality of delay line taps for each channel.

19. The method of claim 14, wherein the calculating step calculates the band-pass power distribution for each frequency bandwidth by using a minimum variance method for minimizing an output power of the microphone array under constraints that a response of the microphone array for one direction or position is to be maintained constant.

20. The method of claim 14, wherein the extracting step extracts the band-pass power distribution for each frequency bandwidth calculated by the calculating step for the sound source position or direction estimated by the calculating step directly as the speech parameter.

21. The method of claim 14, wherein the calculating step synthesizes the calculated band-pass power distributions for a plurality of frequency bandwidths by weighting the calculated band-pass power distributions with respective weights, and summing weighted band-pass power distributions.

22. The method of claim 14, wherein the calculating step estimates the sound source position or direction by detecting a peak in the synthesized band-pass power distribution and setting a position or direction corresponding to a detected peak as the sound source position or direction.

23. A microphone array input type speech analysis method, comprising the steps of:

inputting speeches in a plurality of channels using a microphone array formed by a plurality of microphones;

analyzing an input speech of each channel inputted by the inputting step, and obtaining band-pass waveforms for each channel, each band-pass waveform being a waveform for each frequency bandwidth;

calculating a band-pass power distribution for each frequency bandwidth from the band-pass waveforms for each frequency bandwidth obtained by the analyzing step, synthesizing calculated band-pass power distributions for a plurality of frequency bandwidths, and estimating a sound source position or direction from a synthesized band-pass power distribution; and extracting a speech parameter from the band-pass power distribution for each frequency bandwidth calculated by the calculating step, according to the sound source position or direction estimated by the calculating step.

24. The method of claim 23, wherein the calculating step includes the steps of:

a low resolution sound source position estimation step for estimating a rough sound source position or direction, by minimizing an output power of the microphone array under constraints that responses of the microphone array for a plurality of directions or positions are to be maintained constant; and a high resolution sound source position estimation step for estimating an accurate sound source position or direction in a vicinity of the rough sound source position or direction estimated by the low resolution sound source position estimation step, by minimizing the output power of the microphone array under constraints that a response of the microphone array for one direction or position is to be maintained constant, wherein the extracting step extracts the speech parameter according to the accurate sound source position or direction.

25. A microphone array input type speech analysis method, comprising the steps of:

inputting speeches in a plurality of channels using a microphone array formed by a plurality of microphones;

analyzing an input speech of each channel inputted by the inputting step, and obtaining band-pass waveforms for each channel, each band-pass waveform being a waveform for each frequency bandwidth; and calculating a band-pass power distribution for each frequency bandwidth from the band-pass waveforms for each frequency bandwidth obtained by the analyzing step, synthesizing calculated band-pass power distributions for a plurality of frequency bandwidths, and estimating a sound source position or direction from a synthesized band-pass power distribution.

26. The method of claim 25, wherein the calculating step includes the steps of:

a low resolution sound source position estimation step for estimating a rough sound source position or direction, by minimizing an output power of the microphone array under constraints that responses of the microphone array for a plurality of directions or positions are to be maintained constant; and a high resolution sound source position estimation step for estimating an accurate sound source position or direction in a vicinity of the rough sound source position or direction estimated by the low resolution sound source position estimation step, by minimizing the output power of the microphone array under constraints that a response of the microphone array for one direction or position is to be maintained constant.

* * * * *